United States Patent [19]
Gilbert

[11] Patent Number: 5,974,727
[45] Date of Patent: Nov. 2, 1999

[54] DECORATIVE FLYING INSECT TRAP

[75] Inventor: David Gilbert, Jonesboro, Ark.

[73] Assignee: Gilbert Industries, Jonesboro, Ark.

[21] Appl. No.: 09/186,609

[22] Filed: Nov. 6, 1998

[51] Int. Cl.$^6$ ................................................. A01M 1/04
[52] U.S. Cl. ................................................. 43/113; 43/114
[58] Field of Search ......................... 43/113, 114, 1, 43/58; D22/122; D26/72, 75, 76, 77, 78

[56] References Cited

U.S. PATENT DOCUMENTS

| | | | |
|---|---|---|---|
| D. 269,632 | 7/1983 | Robertson | D22/6 |
| D. 325,954 | 5/1992 | Lazzeroni, Sr. | D22/123 |
| D. 335,912 | 5/1993 | Brown | D22/122 |
| D. 364,479 | 11/1995 | Gilbert . | |
| D. 394,518 | 5/1998 | Burrow . | |
| 4,876,822 | 10/1989 | White | 43/113 |
| 5,365,690 | 11/1994 | Nelson et al. . | |
| 5,505,017 | 4/1996 | Nelson | 43/113 |
| 5,608,987 | 3/1997 | Meyer | 43/113 |
| 5,651,211 | 7/1997 | Regan | 43/113 |

*Primary Examiner*—Jack W. Lavinder
*Attorney, Agent, or Firm*—Hill & Simpson

[57] ABSTRACT

A flying insect trap has a trap housing with an enclosure for a source of insect attracting light and an adhesive surface for immobilizing flying insects which are attracted by the light. The source of insect attracting light and the adhesive surface are disposed in an enclosure within the trap housing, which is completely closed at the top and sides, so that no light is directed or reflected onto the vertical surface to which the trap is mounted. The trap housing has a front panel with an opening therein substantially in registration with the enclosure, the opening allowing light from the source of insect attracting light to exit the enclosure exclusively toward the front of the trap. The opening in the front panel also allows the source of insect attracting light to be substantially completely directly viewed through the opening.

15 Claims, 3 Drawing Sheets

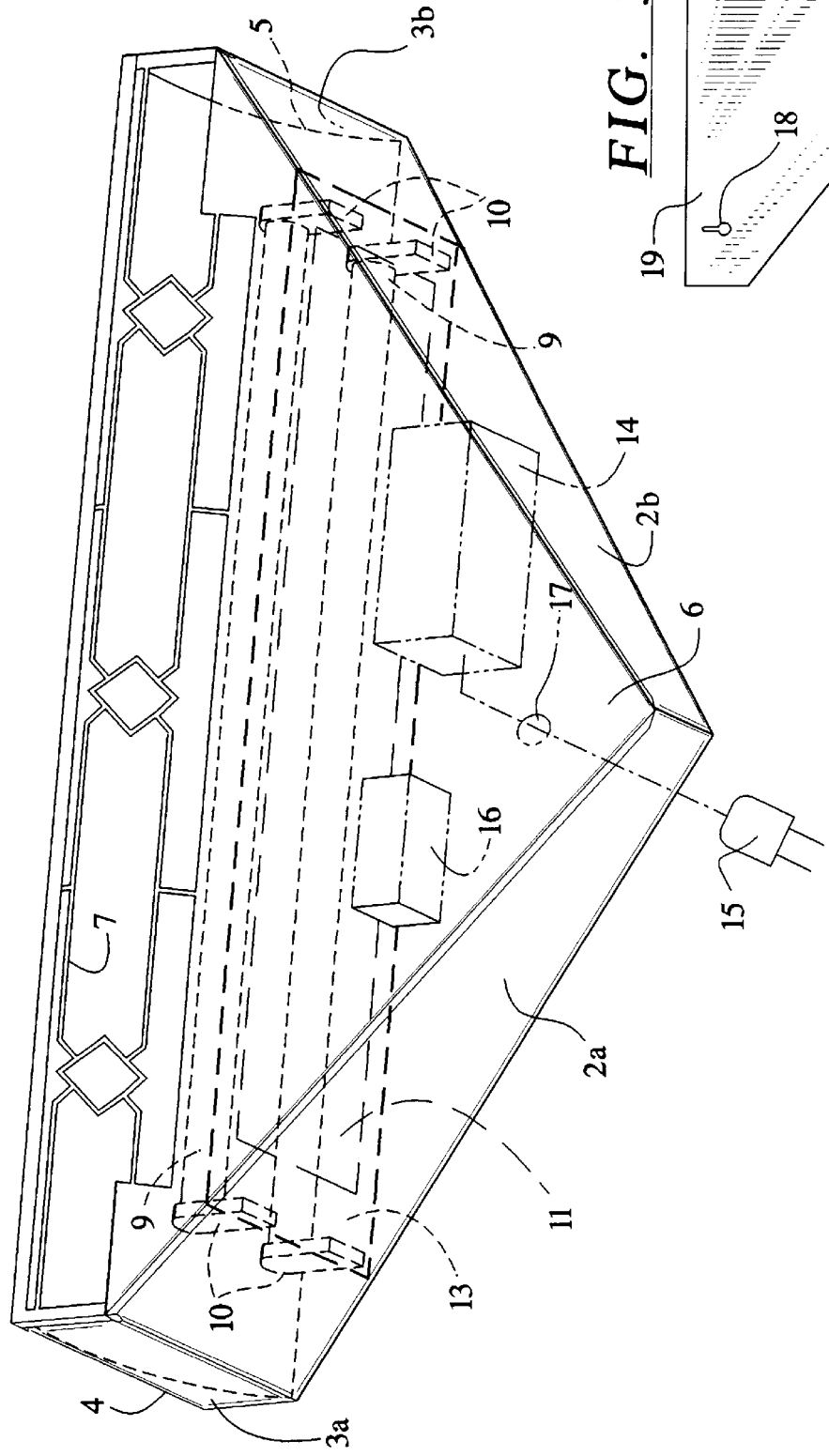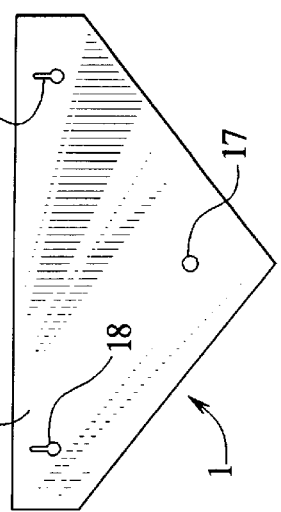

DECORATIVE FLYING INSECT TRAP

BACKGROUND OF THE INVENTION

1. Field of the Invention

The present invention is directed to a trap for flying insects, particularly flies, of the type having a source of insect attracting light and an adhesive surface disposed in the vicinity of said source of insect attracting light, on which insects attracted to the light become immobilized.

2. Description of the Prior Art

Many types of traps for flying insects, particularly flies, are known which employ various methods for killing or immobilizing the insects which enter the trap. Typically, such traps also employ some type of insect attractor in order to lure the insects into the trap. Insect attracting chemicals and insect attracting light sources are commonly employed for this purpose.

So-called electrocuting traps are particularly effective traps of the above general type. Such traps employ wires or a grid connected to a voltage source, and insects coming into contact with these wires or grid are thereby electrocuted. When this occurs, there is an audible sound associated with the electrocution of the flying insect.

This audible sound makes electrocuting traps undesirable for use in facilities such as restaurants wherein food is served, or in any commercial or private location where the repeated noise associated with electrocuting traps would be inappropriate or discomforting to patrons of the establishment or guests of a private residence.

In order to avoid the use of electrocuting traps in such locations, so-called glueboard traps have been developed. These traps typically employ a source of insect attracting light, and an adhesive surface, known as a glueboard, which is disposed relatively close to the source of insect attracting light. Flying insects which are attracted by the light alight or walk on the glueboard, and become adhered thereto, and thus are immobilized within the trap. Typically, the glueboard is removable from the trap so that it can be periodically replaced with a clean glueboard.

One such known flying insect trap of the so-called glueboard type is described in U.S. Pat. No. 4,876,822. This unit has a rectilinear housing in which a fluorescent bulb is disposed, which emits ultraviolet radiation. The top of the rectilinear enclosure is provided with a removable cover, and the unit can be used with or without the cover in place, i.e., the top of the enclosure can be completely closed when the cover is in place, or can be completely open when the cover is removed. The bottom of the enclosure has an opening therein, with the glueboard being disposed below the bulb and adjacent this opening. The opening in the bottom of the enclosure is for the purpose of illuminating signage which may be disposed beneath the lamp enclosure, such as an exit sign. The unit is typically mounted to a vertical surface, such as the wall of a room, or it can be hung from the ceiling.

Another known trap of the glueboard type is described in U.S. Pat. No. 5,365,690. The lamp enclosure for this unit is described as having angled walls, which produce a combination of direct light from the light source and reflected light from the light source onto either a vertical or horizontal surface. According to the teachings of U.S. Pat. No. 5,365,690, such a combination of direct and reflected light results in improved insect attractancy, and therefore according to the teachings of this patent an improved insect catching rate is also achieved.

U.S. Pat. No. 5,365,690 teaches that the most likely direction of entry of an insect into the trap enclosure will be vertically into an upwardly facing trap. Accordingly, U.S. Pat. No. 5,365,690 states that it is highly desirable to avoid placing any substantial barrier in the flying insect trap that would prevent entry from above. U.S. Pat. No. 5,365,690 states that no barrier should be placed to impede insects from walking down the vertical surface into the trap, and the light sources should not be substantially obscured at this top opening by any portion of the housing. U.S. Pat. No. 5,365,690 also states that bare light sources do not attract insects as well as a combination of direct radiated light and a diffused display of reflective light on the vertical surface.

The trap described in U.S. Pat. No. 5,365,690 is commercially offered by Ecolab, Inc. under the designation Stealth®. In the commercial embodiment, the lamp enclosure is made of white plastic and is relatively large and unattractive. The exterior appearance of the Stealth® trap would not be considered appropriate, for example, for use in a restaurant with a modestly decorative motif. A much more aesthetically attractive glueboard trap was sold by Gilbert Industries under the name Flying Venus. This trap has been sold in several versions. The earliest version was as shown in U.S. Pat. No. Des. 364,479. This trap has an exterior housing generally in the shape of a wide V, and has an open top. One or two ultraviolet emitting fluorescent bulbs are disposed in a lamp enclosure, the bulbs being directly viewable through the open top of the housing and enclosure. In the version of the Flying Venus trap shown in U.S. Pat. No. Des. 364,479, the front panel of the enclosure can be lifted upwardly, to facilitate replacement of the glueboard. This front panel has a series of rectangular openings therein, so that the bulbs also can be directly viewed through these openings. The lamp enclosure in this version of the Flying Venus had two sidewalls disposed at an angle relative to the base to which the bulbs are mounted.

In a later version of the Flying Venus trap, the exterior housing maintained the same general V-shape, however, the front was made completely solid, i.e., the rectangular openings were eliminated. The lamp enclosure was changed to a completely rectilinear enclosure, i.e., all angles therein were 90°. Again, the top of the lamp enclosure was open.

All versions of the Flying Venus were sold with a highly decorative exterior appearance, such as burnished brass or aluminum covered with black or white vinyl. Since the enclosure was entirely metallic, even the vinyl-covered versions exhibited a decorative appearance, with all versions being well-suited for use in an environment wherein they would merely be viewed as a lighting source, and their function as an insect trap may not even be discernable to the casual observer.

Another exterior shape of a wall sconce light fixture is described in U.S. Pat. No. Des. 394,518. This configuration retains the general V-shape of the aforementioned Flying Venus, but the top portion of the enclosure is squared off, so as to conform to the rectilinear shape of the lamp enclosure.

A problem associated with traps such as the Stealth® trap which intentionally produce a pattern of light on the vertical mounting surface, i.e., the wall, to which the trap is attached, is that due to the nature of the ultraviolet light which is used to attract insects, fading of any wall covering, such as paint or wallpaper, immediately above the trap inevitably occurs. Such fading may be discernable even while the trap is in place, but it is particularly distinct and identifiable if and when the mounting location of the trap changes. When the trap is removed, or moved to a different location, the faded pattern on the wall remains without any trap beneath it. This necessitates either re-painting or re-papering the wall every time a trap is removed, or its location is changed, if the trap has been in place for a sufficiently long time to produce the aforementioned fading.

SUMMARY OF THE INVENTION

It is an object of the present invention to provide a trap for flying insects of the so-called glueboard type, which avoids the problem of fading the walled surface to which the trap is mounted, while still retaining effective flying insect catching capability.

The above object is achieved in accordance with the principles of the present invention in a flying insect trap having a source of insect attracting light, an adhesive surface on which insects attracted by the light alight and become immobilized, and a housing for the light source and the adhesive surface containing a curved reflector which projects the light from the light source exclusively in a forward direction out of the front of the trap, and wherein the opening in the front of the trap through which the light is emitted allows the source of insect attracting light to be directly viewed. The top of the trap is completely closed, so that substantially no light from the light source, either by direct emission or by reflection off of a component of the trap, reaches the wall surface on which the trap is mounted. As used herein, the term "substantially no light" does not preclude incidental light from reaching the wall surface, such as through openings in the rear of the trap which must necessarily be present to allow for the mounting thereof, or through gaps arising due to manufacturing or assembly tolerances at the seams and corners of the joined metal pieces which form the trap enclosure. Although such incidental light may be very faintly visible to humans and/or flying insects, it is intended that any such incidental light which may escape from the enclosure does not contribute to attracting flying insects to the trap.

The exterior of the trap can be provided with an attractive finish, such as a burnished brass finish, or vinyl covering on any exposed metal surfaces.

The front panel of the trap enclosure can be hinged to the remainder of the enclosure, so that the front panel can be lifted upwardly on the hinges, so as to expose the light source and the adhesive surface. This allows for easy replacement of the light bulbs and/or the adhesive surface as needed, without having to demount the trap from the wall surface.

The opening in the front panel through which the light is exclusively emitted, and which allows direct viewing of the light inside the trap enclosure, can be provided with cutouts in order to form a decorative pattern, thereby further enhancing the overall aesthetic attractiveness of the trap. In one embodiment, the cutouts can form a geometric pattern, such as a pattern composed of lines, squares, diamonds, and other linear or non-linear geometric shapes. In a further embodiment, the cutouts can form attractive scrollwork of any suitable scroll configuration. In a further embodiment, the cutout can form alphanumeric characters which can be used for advertising purposes. For example, the trap can be customized so that the characters will spell or represent the name or trademark associated with a commercial establishment in which the trap is employed. Such characters can be combined with geometric patterns as well.

The present inventor has found that, contrary to the teachings and expectations of the prior art, the use of a pattern of reflected and direct light on the wall surface to which the trap is mounted does not significantly contribute to enhanced insect attractancy. In direct comparison testing between the Stealth® commercial version of the trap described in U.S. Pat. No. 5,365,690, the aforementioned Flying Venus trap showed superior insect catching ability. In direct comparison testing between the inventive trap disclosed herein and the aforementioned Flying Venus trap, the inventive trap showed at least equal, and in some instances superior, insect catching ability. The inventive trap described herein thus rejects the conventional thinking in the fly trap art regarding the necessity of having an open top in order to induce entry of flying insects into the trap, and also rejects the conventional thinking in the flying insect trap art of avoiding direct line of sight visibility of the light source which is used to attract flying insects. In accordance with such established thinking, conventional flying insect traps of the type exemplified above have necessarily resulted in the aforementioned problem of fading the wall surface to which the trap is mounted. By rejecting this conventional thinking, and eliminating any direct or reflected light on the wall surface to which the trap is mounted, fading of the wall surface is prevented, but flying insect catching capability has not been compromised.

DESCRIPTION OF THE DRAWINGS

FIG. 2 is a view from below of the trap shown in FIG. 1, with the front panel closed.

FIG. 3 is a rear view of the trap of FIGS. 1 and 2.

DESCRIPTION OF THE PREFERRED EMBODIMENTS

Figure 1:
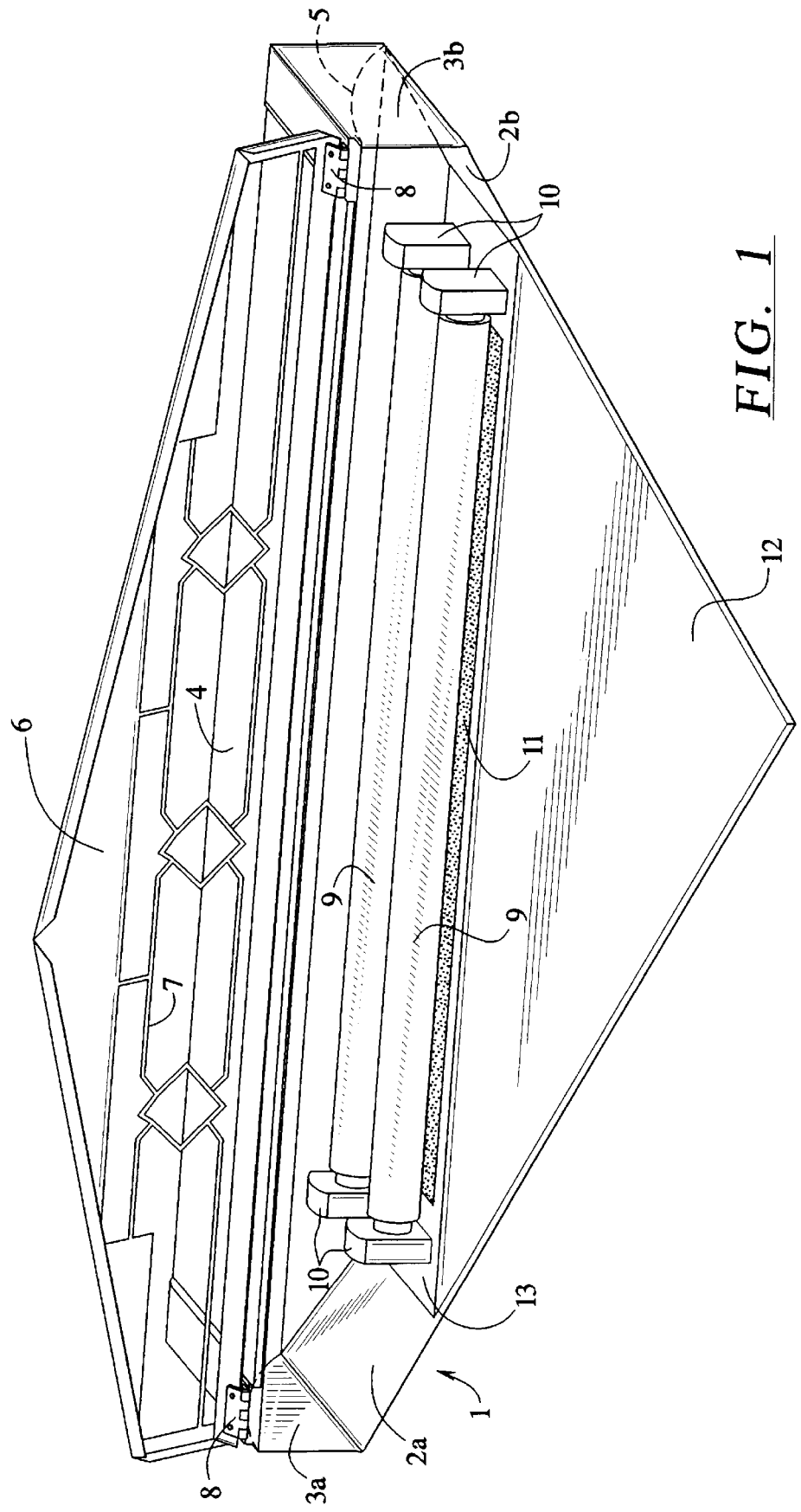
FIG. 1 is a front view of a flying insect trap constructed in accordance with the principles of the present invention, with the front panel lifted upwardly to expose the bulbs and adhesive surface.

The flying insect trap shown in FIG. 1 has a trap housing 1 which, in the embodiment shown in the drawings, has a generally wide V-shaped lower portion formed by side walls 2a and 2b, and an upper rectilinear portion formed by side walls 3a and 3b and a top 4, as well as a rear panel 19 (shown in FIG. 3). Although the configuration of the trap shown in FIG. 1, and in the other FIGS, is considered to be particularly aesthetically attractive, the enclosure 1 need not necessarily have a V-shape as shown. Other configurations of the lower portion of the trap can be employed within the context of the invention.

The lower portion of the interior of the housing 1 contains an electronics enclosure 12, which contains all of the electrical components necessary for operating the trap, further details of which are described below in connection with FIG. 2. The electronics enclosure 12 has an upper surface 13, above which one bulb 9, or two bulbs 9, are supported by bulb mounts 10. The bulbs 9 are of a type conventionally employed in glueboard traps, and emit light in the ultraviolet spectral range.

On the surface 13, beneath the bulb 9 or bulbs 9, a removable adhesive surface 11, commonly referred to as a glueboard, is disposed. Flying insects which are attracted by the light emitted by the bulb 9 or the bulbs 9 will alight on or walk onto the adhesive surface 11 and will be immobilized thereon. The adhesive surface 11 can be enhanced with an insect-attracting chemical, such as a pheromone, sugar water, etc. The use of such chemical attractance is not necessary, however, since the insect attracting capability of the trap configuration itself is sufficient for most purposes.

The enclosure in which the bulb 9 or bulbs 9 and the adhesive surface 11 are contained is formed by the upper surface of the electronics enclosure 12, portions of the respective side walls 2a and 2b, the side walls 3a and 3b, and a curved interior panel 5, extending from the bottom or a lower portion of the rear panel 19 to the front edge, or near the front edge, of the top 4.

The housing 1 also has a front panel 6 which is attached by hinges 8 to the front edge of the top 4, so that the panel 6 can be pivoted on the hinges 8 between an open position shown in FIG. 1, and a closed position shown in FIG. 2. Some type of holder, such as a magnet or a mechanical catch, can be provided near the bottom of the front panel 6 and/or near the bottom of the electronics enclosure 12 to releasably hold the front panel in place in the closed position.

The upper portion of the front panel 6, which in the enclosed position is disposed in front of the bulb 9 or bulbs 9, is substantially open, but includes a decorative pattern formed by cutouts, leaving a pattern of material in the shape of a desired configuration. Since the housing 1 is preferably made completely of sheet metal panels joined together by any suitable means, computer-controlled stamping machines can be used to produce the desired pattern in the front panel 6. In the embodiment shown in FIGS. 1 and 2, the front panel 6 has a geometric pattern therein, formed by a series of lines and diamonds. The opening in the front panel 6, at least in the region thereof in registration with the bulb 9 or bulbs 9, extends so as to be approximately at or slightly below the bottom of the bulb 9, so that a substantial portion, if not all, of the bulb 9 is directly viewable through the opening in the front panel 6, notwithstanding the presence of the geometric pattern 7 in the opening. The curved panel 5 assists in reflecting light from the bulb 9 or the bulbs 9 exclusively out the front of the trap housing 1. Since the enclosure for the bulb 9 or bulbs 9 is otherwise completely closed (except for possible unintentional gaps at the seams or corners due to tolerance variations in the assembly of the various sheet metal panels), no light, or no significant light, either direct or reflected is present on the wall surface to which the enclosure 1 is mounted.

The structure forming the enclosure for the insect attracting light sources (i.e. the bulb 9 or bulbs 9) and the adhesive surface 11 therefore has two attributes. The enclosure projects light from the bulb 9 or bulbs 9 exclusively through the opening in the front panel 6, and allows direct viewing of a substantial portion, if not all, of the bulb 9 (if a single bulb is used) or the front most of the bulbs 9 (if two bulbs are used). This assumes a placement of the trap so that the single bulb 9 or the front most bulb 9 will be approximately at eye level. Of course, if the trap is mounted at slightly below eye level, it is possible that a viewer could see all or a portion of the rear bulb 9 (if two bulbs are employed) as well.

The view shown in FIG. 2 schematically illustrates electronic components, shown in phantom, within the electronics enclosure 12. These components will at least include a ballast 14 for the fluorescent bulb 9 or bulbs 9, to which a standard electrical plug 15 is connected. The insulated wires from the plug 15 to the ballast 14 proceed through an opening 17 in the rear of the trap. Other electrical components, schematically illustrated at 16, can also be included. Although the trap can be operated merely by plugging and unplugging the plug 15 in a standard electrical socket, the other electrical component 16 may, for example, include an on/off switch. All of the electrical components contained in the electronics enclosure 12 are conventional, and are the same as employed in the aforementioned Flying Venus trap, and therefore need not be further described in detail. Moreover, the respective electrical interconnections between the components are standard and well known, and therefore need not be shown or described in further detail.

The trap housing 1 is intended for mounting on a vertical surface, such as the wall of a room. For this purpose, any suitable mounting elements or structure can be employed. One such mounting structure is shown in the rear view of the housing 1 in FIG. 3. In this embodiment, two key holes 18 are present in the rear panel 19 of the upper portion of the housing 1, for receiving screws or hooks mounted in the vertical surface. Whatever structure is employed to attach the housing 1 to the vertical surface will result in the rear of the housing 1 being flush against the vertical surface.

Figure 4:
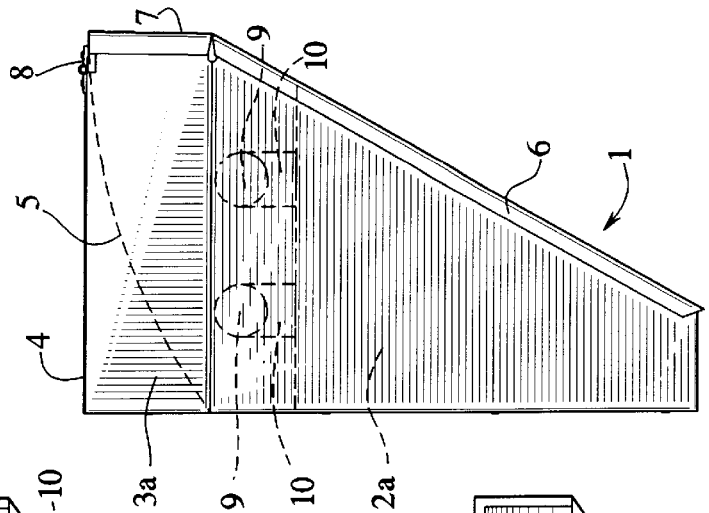
FIG. 4 is a side view of the trap of FIGS. 1, 2 and 3.

FIG. 4 is a side view of the trap shown in FIGS. 1, 2 and 3, wherein the positioning of the curved panel 5 within the bulb enclosure can be seen.

Figure 5:
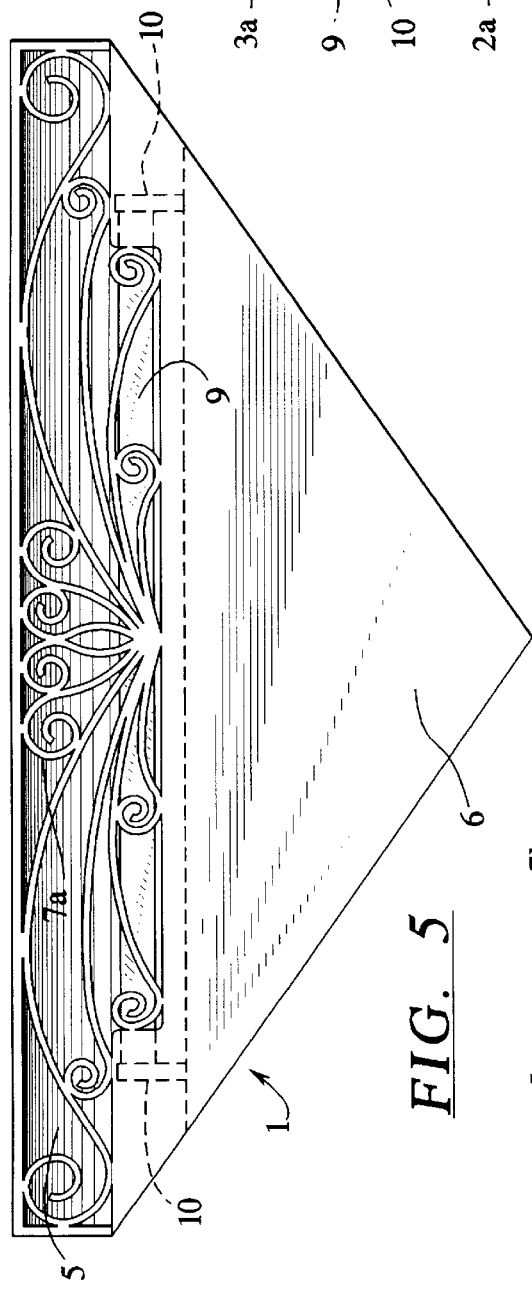
FIG. 5 is a front view of a flying insect trap constructed in accordance with the principles of the present invention, showing a further embodiment of a decorative design in the front panel.

FIG. 5 shows a further embodiment for a decorative design which can be made in the opening in the front panel 6. In the embodiment shown in FIG. 5, a scrollwork design 7a is employed. Again, this can be produced by computer-controlled sheet metal stamping. As can be seen in FIG. 5, the bulb 9 is still substantially completely visible through the opening in the front panel 6, notwithstanding the presence of the scrollwork design 7a.

Figure 6:
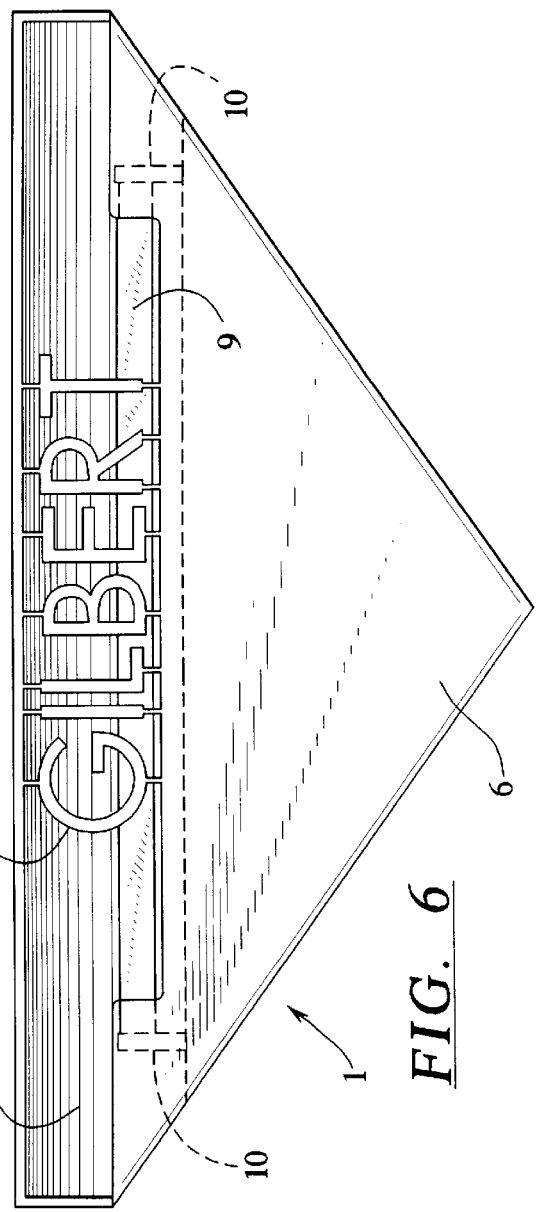
FIG. 6 is a front view of a flying insect trap constructed in accordance with the principles of the present invention, showing an embodiment of the front panel suitable for advertising purposes.

Another embodiment is shown in FIG. 6, wherein alpha-numeric characters such as lettering 7b for advertising purposes are stamped in the opening in the front panel 6. The lettering 7b can be used to spell a name or a trademark or any other suitable designation for advertising purposes, such as a name or trademark or designation associated with a commercial establishment in which the trap is employed. Combinations of a geometrical design 7 (although not necessarily the specific design shown in the drawings) and a scrollwork design 7a (although not necessarily the specific scrollwork design shown in FIG. 5) and lettering 7b (spelling any suitable name, word or designation) can be used.

Although modifications and changes may be suggested by those skilled in the art, it is the intention of the inventor to embody within the patent warranted hereon all changes and modifications as reasonably and properly come within the scope of his contribution to the art.

I claim as my invention:

1. A flying insect trap comprising:

a trap housing having a closed top and closed sides and a front panel with an opening therein;

a source of insect attracting light;

an adhesive surface; and an enclosure in said trap housing for said source of insect attracting light and said adhesive surface, said enclosure being in substantial registration with said opening in said front panel so that said insect attracting light from said source of insect attracting light is emitted exclusively from said enclosure through said front opening, and a substantial portion of said source of insect attracting light being directly viewable through said opening in said front panel.

2. A flying insect trap as claimed in claim 1 wherein said top of said enclosure has a front edge and wherein said trap housing includes a rear panel, and wherein said enclosure further comprises a curved panel extending from said rear panel of said trap housing substantially to said front edge of said top, said rear panel reflecting said insect attracting light from said source of insect attracting light through said opening in said front panel.

3. A flying insect trap as claimed in claim 1 wherein said front panel consists of panel material, and wherein said opening in said front panel comprises a plurality of cutouts in said front panel leaving selected portions of said panel material in said opening.

4. A flying insect trap as claimed in claim 3 wherein said panel material in said opening forms a decorative design.

5. A flying insect trap as claimed in claim 4 wherein said decorative design comprises a geometrical design.

6. A flying insect trap as claimed in claim 4 wherein said decorative design comprises a scrollwork design.

7. A flying insect trap as claimed in claim 3 wherein said panel material in said opening comprises a plurality of alphanumeric characters.

8. A flying insect trap as claimed in claim 1 further comprising hinges connecting said front panel to a remainder of said trap housing, allowing said front panel to be pivoted upwardly and downwardly on said hinges to allow access to said enclosure.

9. A flying insect trap as claimed in claim 1 wherein said adhesive surface comprises a glueboard which is removable from said enclosure.

10. A flying insect trap as claimed in claim 1 further comprising electronic components for operating said source of insect attracting light and an electronics enclosure, containing said electronics components, contained in said trap housing, said electronics enclosure having a top exterior surface forming a bottom of said enclosure for said source of insect attracting light and said adhesive surface.

11. A flying insect trap as claimed in claim 10 wherein said adhesive surface is disposed on said top exterior surface of said electronics enclosure.

12. A flying insect trap as claimed in claim 11 wherein said source of insect attracting light comprises a fluorescent bulb mounted on said topic exterior surface of said electronics enclosure, above said adhesive surface.

13. A flying insect trap as claimed in claim 1 wherein said trap housing comprises a lower portion having a V-shape and an upper portion, contiguous with said lower portion, having a rectilinear shape.

14. A flying insect trap as claimed in claim 1 wherein said source of insect attracting light comprises a fluorescent ultraviolet bulb.

15. A flying insect trap as claimed in claim 1 wherein said trap housing has a rear panel, and further comprising means for mounting said rear panel to a vertical mounting surface.

* * * * *